United States Patent
Matsui

(10) Patent No.: US 6,441,924 B1
(45) Date of Patent: Aug. 27, 2002

(54) SYSTEM FOR AUTOMATICALLY DISTRIBUTING RECEIVED DOCUMENTS

(75) Inventor: Tsunehiro Matsui, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 08/477,770

(22) Filed: Jun. 7, 1995

Related U.S. Application Data

(63) Continuation-in-part of application No. 08/394,940, filed on Feb. 27, 1995, which is a continuation of application No. 07/760,327, filed on Sep. 16, 1991, now abandoned.

(30) Foreign Application Priority Data

Nov. 2, 1990 (JP) ............................................. 2-298198

(51) Int. Cl.$^7$ ................................................. H04N 1/00
(52) U.S. Cl. ...................... 358/403; 358/407; 358/434; 358/440
(58) Field of Search ................................ 358/400, 402, 358/403, 407, 434, 435, 436, 438, 439, 440, 442, 444; 379/100

(56) References Cited

U.S. PATENT DOCUMENTS

| 4,532,379 A | | 7/1985 | Tsukioka ..................... 358/407 |
| 4,922,348 A | | 5/1990 | Gillin et al. ................. 358/407 |
| 4,994,926 A | * | 2/1991 | Gordon et al. .............. 358/400 |
| 5,091,790 A | * | 2/1992 | Silverberg ................... 358/434 |
| 5,224,156 A | * | 6/1993 | Fuller et al. ................. 379/100 |

FOREIGN PATENT DOCUMENTS

| JP | 60-148266 | 8/1985 |
| JP | 63-202158 | 8/1988 |

* cited by examiner

*Primary Examiner*—Thomas D. Lee
(74) *Attorney, Agent, or Firm*—Finnegan, Henderson, Farabow, Garrett & Dunner LLP

(57) ABSTRACT

System for automatically distributing a received document in which a plurality of computers, each of which having at least one mail box, are connected to a facsimile apparatus via a network so that a document received through the facsimile apparatus is outputted to a specific mail box within the plurality of computers in accordance with protocol commands received together with the document.

6 Claims, 5 Drawing Sheets

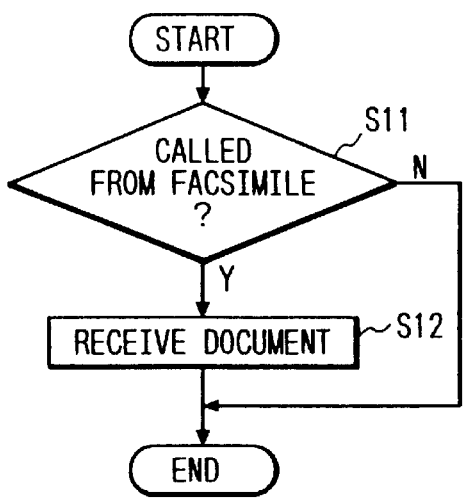
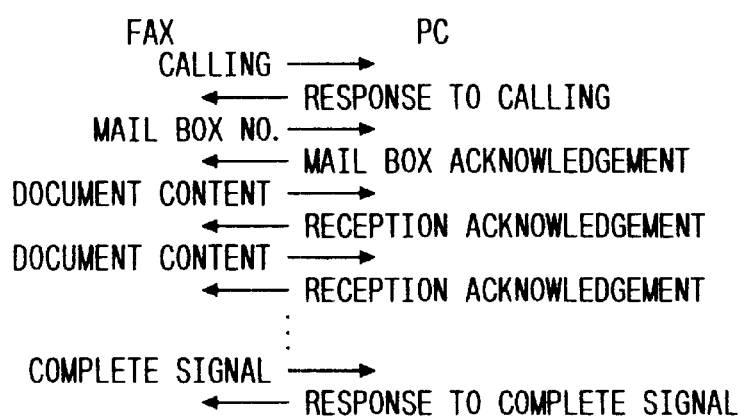
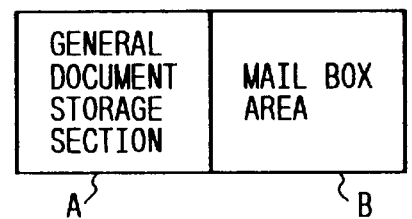

SYSTEM FOR AUTOMATICALLY DISTRIBUTING RECEIVED DOCUMENTS

DESCRIPTION OF RELATED CASES

This application is a continuation-in-part of U.S. patent application Ser. No. 08/394,940, filed Feb. 27, 1995; which is a continuation of Ser. No. 07/760,327, filed Sep. 16, 1991, now abandoned.

BACKGROUND OF THE INVENTION

FIELD OF THE INVENTION

The present invention relates to a method of automatically distributing received documents, and more particularly to a method of automatically distributing received documents where the documents received through a facsimile apparatus are outputted to a plurality of computers.

A facsimile apparatus having a mail box function has been widely used. FIG. 6 shows block diagram of a storage area of an image information memory of the facsimile apparatus.

As shown in FIG. 6, the storage area of the image information memory has a general document memory section A and a mail box area B. In the general document memory section A received documents are stored whose mailing addresses are not assigned in the mail box area B, while in the mail box area B received documents are stored which are supposed to be distributed to predetermined mail boxes. The mail box memory area corresponds to a previously registered password.

If the protocol contains mail-box-specifying information, then the incoming document is stored in the mail box area (hereinafter simply referred to as mail box) in accordance with the specified information, so that only a person who inputs that password can take out the stored data.

Recently, a system has been used where a facsimile apparatus is remotely controlled by inputting a password from a personal computer (referred to as PC hereinafter) so as to print out the document stored in the mail box with the printer of the facsimile apparatus.

The aforementioned prior art apparatus has the following drawbacks.

A limited memory size is previously assigned to the mail box. Meanwhile, the mail box in the facsimile apparatus is usually used by a plurality of subscribers. Thus, when a large amount of document storage space is used for a specific subscriber, only a limited memory area is available to the other subscribers.

SUMMARY OF THE INVENTION

The present invention has an object to solve the aforementioned drawbacks, and provides a method of automatically distributing received documents such that the received documents are quickly delivered to right persons, thus alleviating the load on memory means of the facsimile apparatus.

In order to resolve the aforementioned drawbacks of the prior art, the present invention is characterized in that a plurality of computers, each of which having at least one mail box, are connected to a facsimile apparatus via a network so that a document received through the facsimile apparatus is outputted to a specific mail box within the plurality of computers in accordance with protocol commands received together with the document.

According to the present invention of the aforementioned construction, the facsimile apparatus distributes the received document to a predetermined mail box in accordance with the protocol. Thus, the image information memory section of the facsimile apparatus is used only as a means for temporarily storing documents received for each subscriber who has a computer mail box. Thus, most of the facsimile apparatus memory area is available for use by subscribers of the mail box within the facsimile apparatus.

BRIEF DESCRIPTION OF THE DRAWINGS

FIG. 4 is a flowchart showing the operation of the embodiment at a PC side of the system;

FIG. 5 shows a document transmitting sequence between a facsimile and a PC;

FIG. 6 is an illustrative diagram of an image information memory section;

DESCRIPTION OF THE PREFERRED EMBODIMENT

Figure 1:
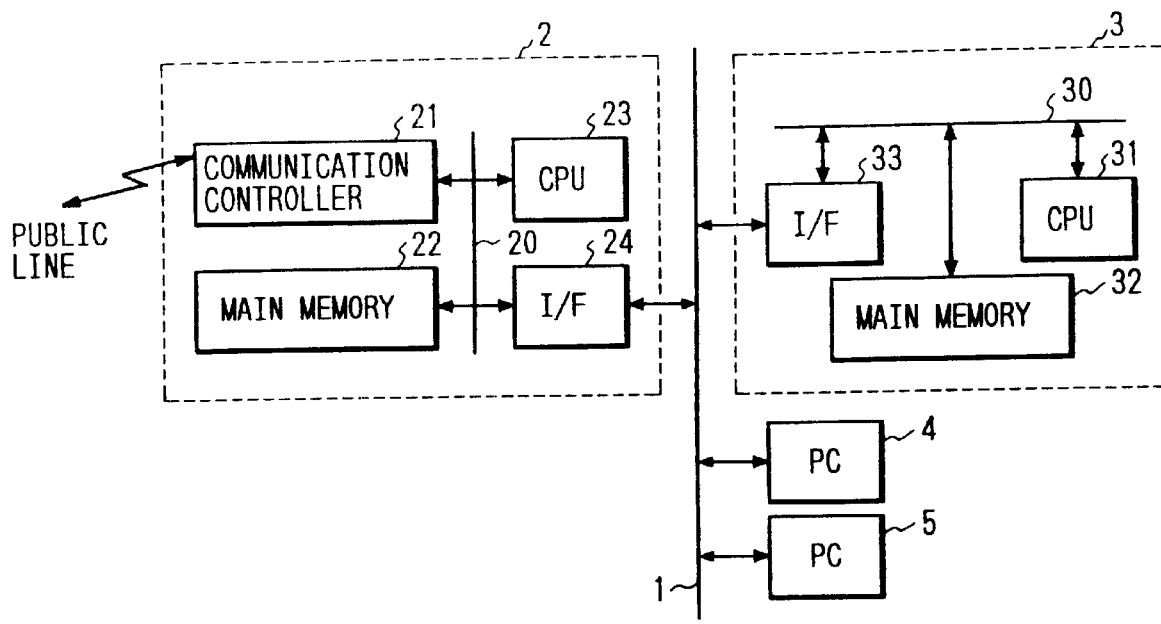
FIG. 1 is a block diagram showing essential parts of an embodiment of a system according to the present invention.

The present invention will now be described in detail with reference to the drawings. FIG. 1 is a general block diagram showing an embodiment of an automatic document-distributing system according to the present invention.

In FIG. 1, a network 1 of this invention has a facsimile apparatus 2 connected to PCs 3, 4, and 5.

Conventionally, a receiving facsimile receives designation information of a mail box contained in a protocol command received from a transmitting facsimile, and stores document data into a mail box designated by the designation information.

The facsimile apparatus 2 has a communication controller 21, main memory 22, system controller (CPU) 23, and interface 24, which are all connected to a system bus 20.

Meanwhile, the PC 3 also has a CPU 31, main memory 32, and interface 33, which are all connected to a system bus 30.

A mail box area as shown in FIG. 6 is provided in the main memory 22 of facsimile apparatus 2. Likewise, in the main memory 32 of PC 3, a mail box is also provided.

The PCs 4 and 5 have a construction similar to that of the PC 3.

With the above-described construction, documents are inputted into a facsimile apparatus through the communication controller 21 from a public line, of which documents to be distributed to their assigned mail boxes are stored in the mail box area of the main memory 22 and the other documents are stored in the general document memory area of the main memory.

Of the documents stored in the mail box area, the documents to be distributed to the PCs 3–5 are transferred from the main memory of the facsimile apparatus to the respective mail boxes of the PCs 3–5.

Of the stored documents, the documents not to be distributed to any mail box of PCs 3–5 are held in the mail box of main memory 22 of the facsimile apparatus 2 and are printed out with a print device in accordance with a printout command supplied through an input means (not shown).

The interfaces 24 and 33 are properly selected depending on whether the data transmission between the facsimile apparatus 2 and the PCs 3–5 is performed in the serial modes or parallel modes. The typical serial mode type uses an interface that meets RS-232C of Electronics Industries Association of America, while the typical parallel mode type uses an interface that meets SCSI of the Electronics Industries Association of America.

The distribution function will now be generally described where the document received with the facsimile apparatus is transferred to a particular PC.

Figure 2:
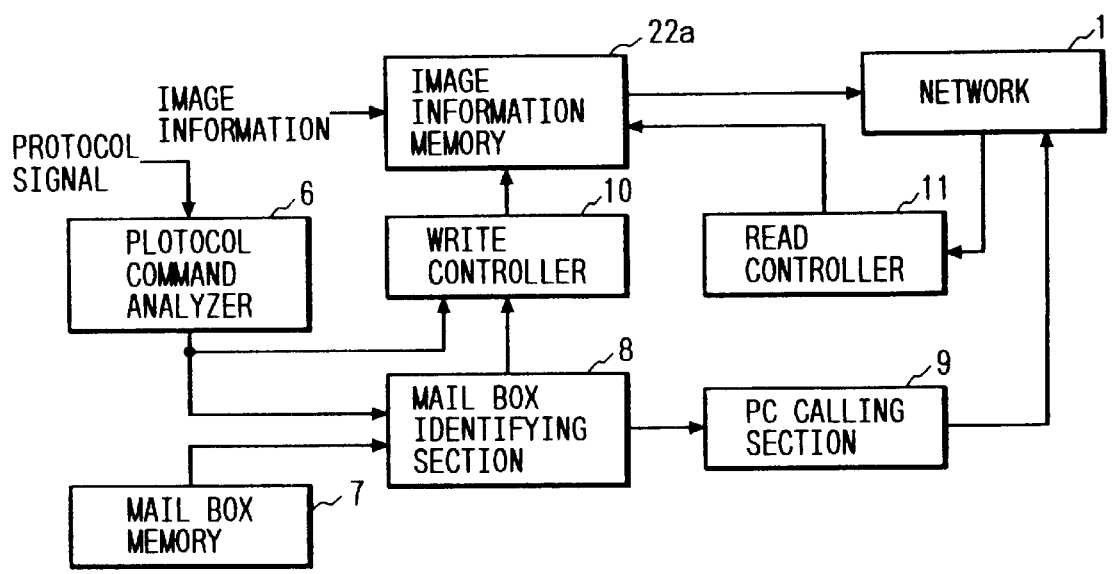
FIG. 2 is a functional block diagram showing essential parts of a facsimile apparatus.

FIG. 2 is a block diagram showing essential functions of the embodiment.

In FIG. 2, a protocol command analyzer 6 in the communication controller 21 determines whether the received document is a general document or a document to be distributed to a mail box. The protocol command analyzer 6 also detects an identifying data from the protocol command, which data specifies an individual mail box.

In the mail box memory section 7, preregistered mail box numbers are stored for the facsimile 2 and the PCs 3–5.

A mail box identifying section 8 receives the mail box numbers from the mail box memory 7 and identifying data for identifying the mail boxes from the protocol command analyzer 6. According to these numbers and identifying data, the mail box identifying section 8 determines whether the received document has an address of the mail boxes in the PCs 3–5 or an address of the mail boxes in the main memory of facsimile apparatus.

If the received document is for the mail boxes of the PCs 3–5, the mail box identifying section 8 supplies a PC calling section 9 with a command for calling a specified PC.

The mail box identifying section 8 calls a specified PC while also outputting a write command to a write controller 10. The write controller 10 is responsive to the write command so as to add a mail box number supplied from the protocol command analyzer 6 to the document, and sends them to an image information memory 22a.

A read controller 11 reads the stored document in response to a read command, which in turn is sent back from the PC calling section 9 in response to a call. The thus read document is transferred to the mail box in the personal computer.

The operation of the embodiment having the above-described functions will now be described with reference to a flowchart.

Figure 3:
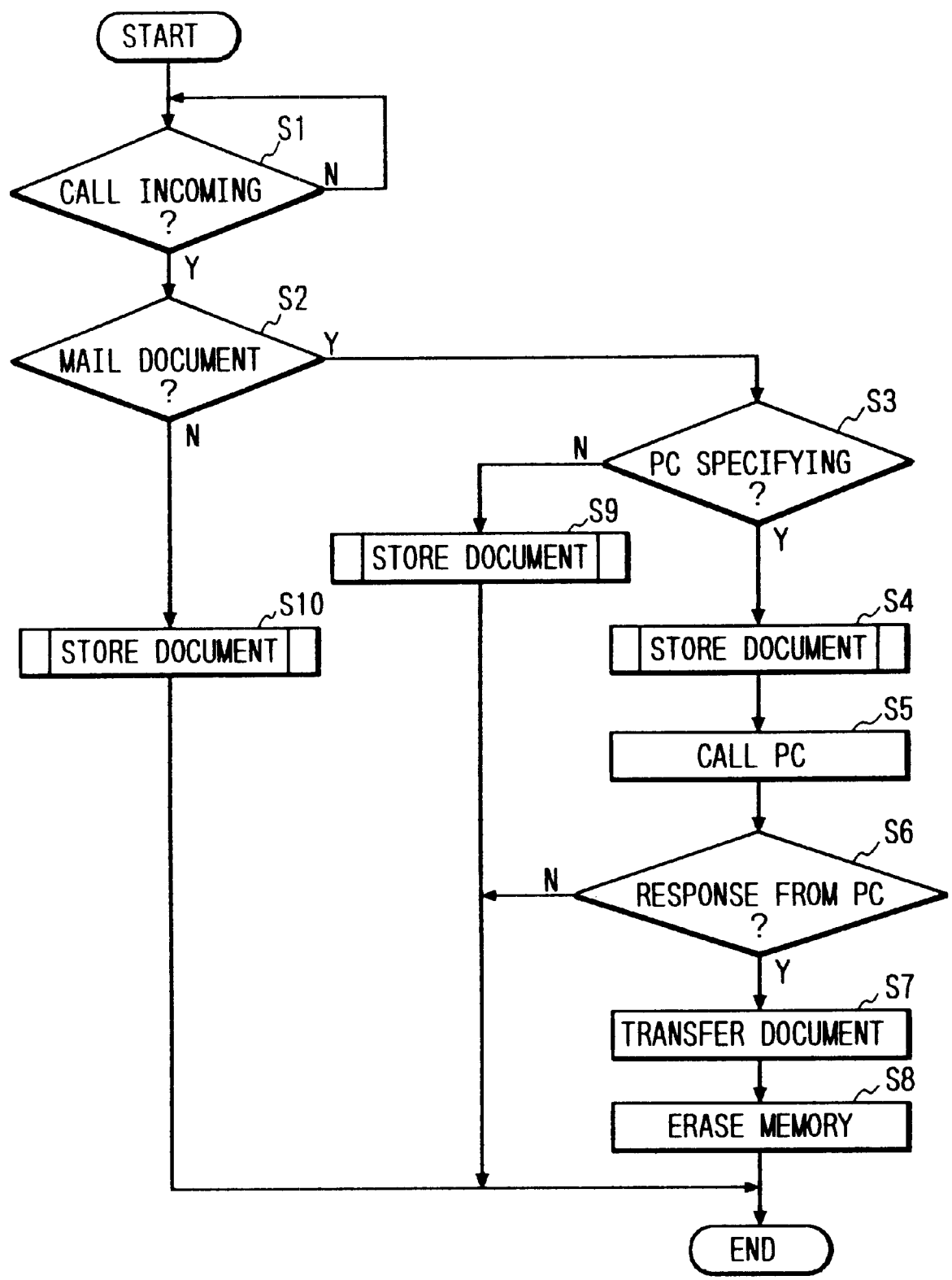
FIG. 3 is a flowchart showing the operation of the embodiment of FIG. 1.

In FIG. 3, call incoming is monitored at step 1, and if call incoming is detected, then the program proceeds to step 2 where it is determined whether the document is addressed to the mail box or not. If the document is addressed to the mail box, then the program proceeds to step 3. At step 3, it is determined whether the document has an address of the mail box within the facsimile apparatus or a mail box of the PCs.

Meanwhile, if the document is not to be distributed to the mail boxes of PCs, the program proceeds to step 10 where normal reception is performed so as to store the document into the image information memory 22a.

If the document is addressed to the mail box in the facsimile apparatus at step 3, the program proceeds to step 9 where the document is stored with that mail box number.

If the document is addressed to the mail box of the PC, then the program proceeds to step 4 where the document is stored with that mail box number.

At step 5, a personal computer having the specified mail box is called. At step 6, it is determined whether there is any response from the PC. If there is an answer, then the program proceeds to step 7 where the stored document is transferred to the mail box of the PC.

At step 8, the document whose data transfer operation has been completed, is erased from the image information memory 22a of the facsimile apparatus.

If the result at step 6 is no, that is, there is no response from the PC for some reason, e.g., the power is not turned on, then the process is terminated with the document remaining in the image information memory 22a.

Since the stored document has not been erased, the document may be read out and sent to the PC upon transfer command when the facsimile apparatus is accessed by the PC.

Next, the operation in PC upon the document transmitting is described with references to FIGS. 4 and 5.

As apparent from the flowchart of FIG. 4, the PC awaits a call from the facsimile apparatus before initiating document reception processing. That is, only when the interrupt request is received from I/F 33, the processing shown in FIG. 4 is carried out. At other times, the PC may execute other software.

Upon receiving a document (step 12), the following protocol procedure is carried out between the facsimile apparatus and the PC. In response to facsimile calling, the PC returns a response including a password to the facsimile. Then, the facsimile sends a mail box number signal. In response to the mail box number, the PC checks vacant capacity of the memory and returns an acknowledge signal. Then, the PC receives the document sent from the facsimile and stores the document in the memory. When transmitting the document is completed, the facsimile sends a complete signal, and the PC returns a response to the complete signal. When the facsimile receives this response signal, step 8 of FIG. 3 is carried out.

More particularly, a facsimile apparatus of the G3 mode will be described to illustrate the invention in greater detail with reference to FIGS. 7 and 8.

Figure 7:
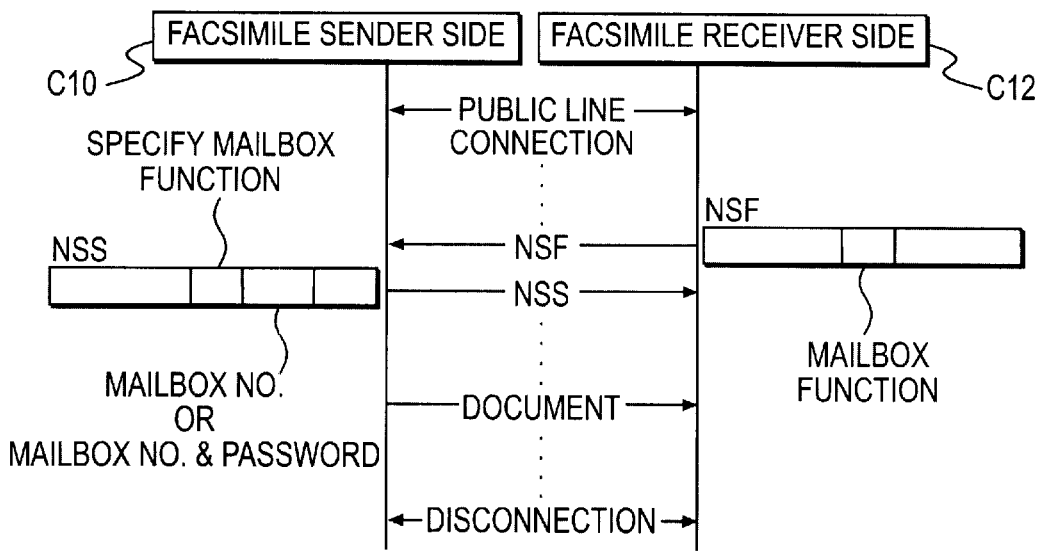
FIG. 7 schematically illustrates a communication procedure of a G3 facsimile.
Figure 8:
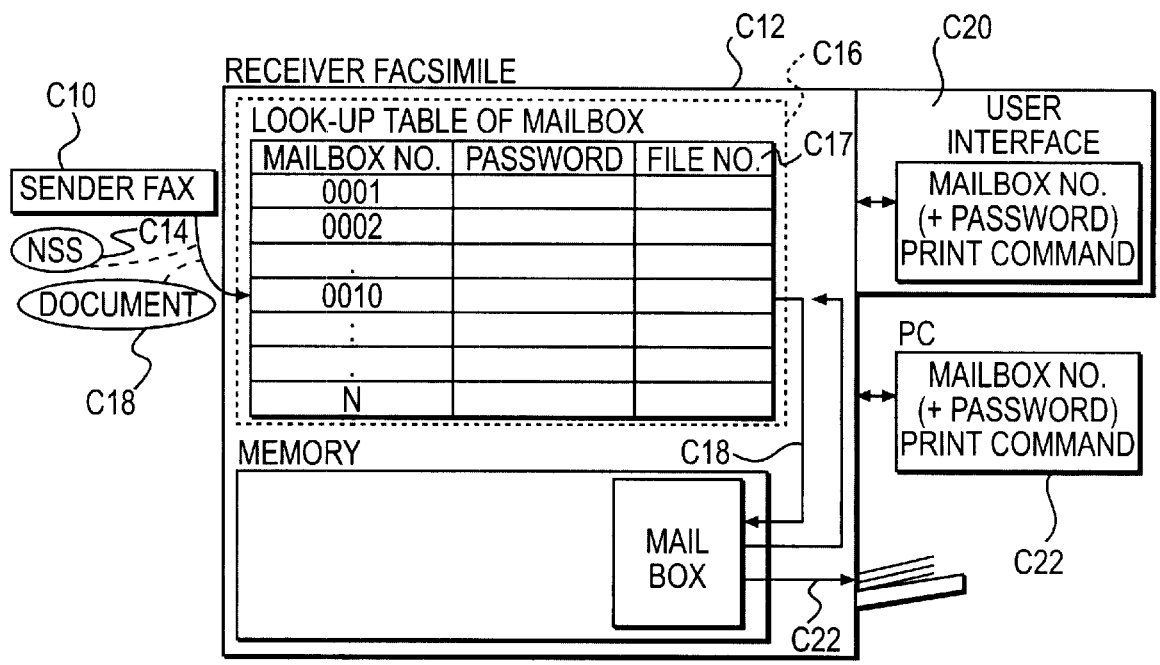
FIG. 8 is a diagram illustrating in greater detail the operation of an automatic document distribution system of the invention.

FIG. 7 schematically shows a communication procedure of a G3 facsimile with respect to mail box communication, and FIG. 8 schematically shows the operation of an automatic received-document distribution system of the present invention, A circuit connection is set up between a transmitting facsimile C10 and a receiving facsimile C12 by way of a public line. The receiving facsimile C12 sends an NSF command containing identification information indicative of the mail box function, through a preset communication.

In accordance with identification information indicative of the mail box function, the transmitting facsimile C10 checks whether the receiving facsimile C12 has the mail box function, and sends, to the receiving facsimile C12, identification information for designating the mail box function, a mail box number of a main box to be designated (in terms of the ASCII code) or an NSS command including a mail box number of a main box to be designated and a password associated with the mail box.

The receiving facsimile C12 determines whether it is a general document or a mail document on the basis of the identification information for designating the mail box function contained in the NSS command (C14 in FIG. 8).

A memory of the receiving facsimile C12 has a previously stored reference table (indicated by a dotted line C16 in FIG. 8) containing mail box numbers, passwords associated therewith, and file numbers indicating locations (areas) in which mail boxes are stored. The reference table C16 may be constructed with pointers for pointing to the stored locations.

The receiving facsimile C12 refers to the reference table C16 on the basis of the mail box number contained in the NSS command, detects a password associated with the main box number, and compares it with the password associated with the mail box number contained in the NSS command. If these passwords are coincident with each other, it refers to the file number of the designated mail box number (see C17 in FIG. 8), thereby to specify the memory location into which a received document is to be stored, and then receives a document C18 and stores the document into the designated memory location in the memory indicated by C18 in FIG. 8.

Thereafter, a mail box number, a password, and a printout instruction for instructing the print-out of a main box are entered from a user interface C20 including a display device, such as an LCD panel, and an input device including various instruction keys, ten keys, and the like. Then, the document stored in the mail box of the mail box number indicated by C22 is output ((8) in FIG. 2).

In a case where the receiver facsimile C12 is remotely controlled by a personal computer, a mail box number and a password are entered from the personal computer (C22 in FIG. 8), and a document stored in the mail box of the mail box number is output to the receiving facsimile (C22 in FIG. 2). In this respect, it is easily achieved by merely replacing the user interface C20 with the personal computer C22.

The conventional art is limited to determining whether a document is a general document or a mail document and to specifying a memory location of a document on the basis of a main box number.

Figure 9:
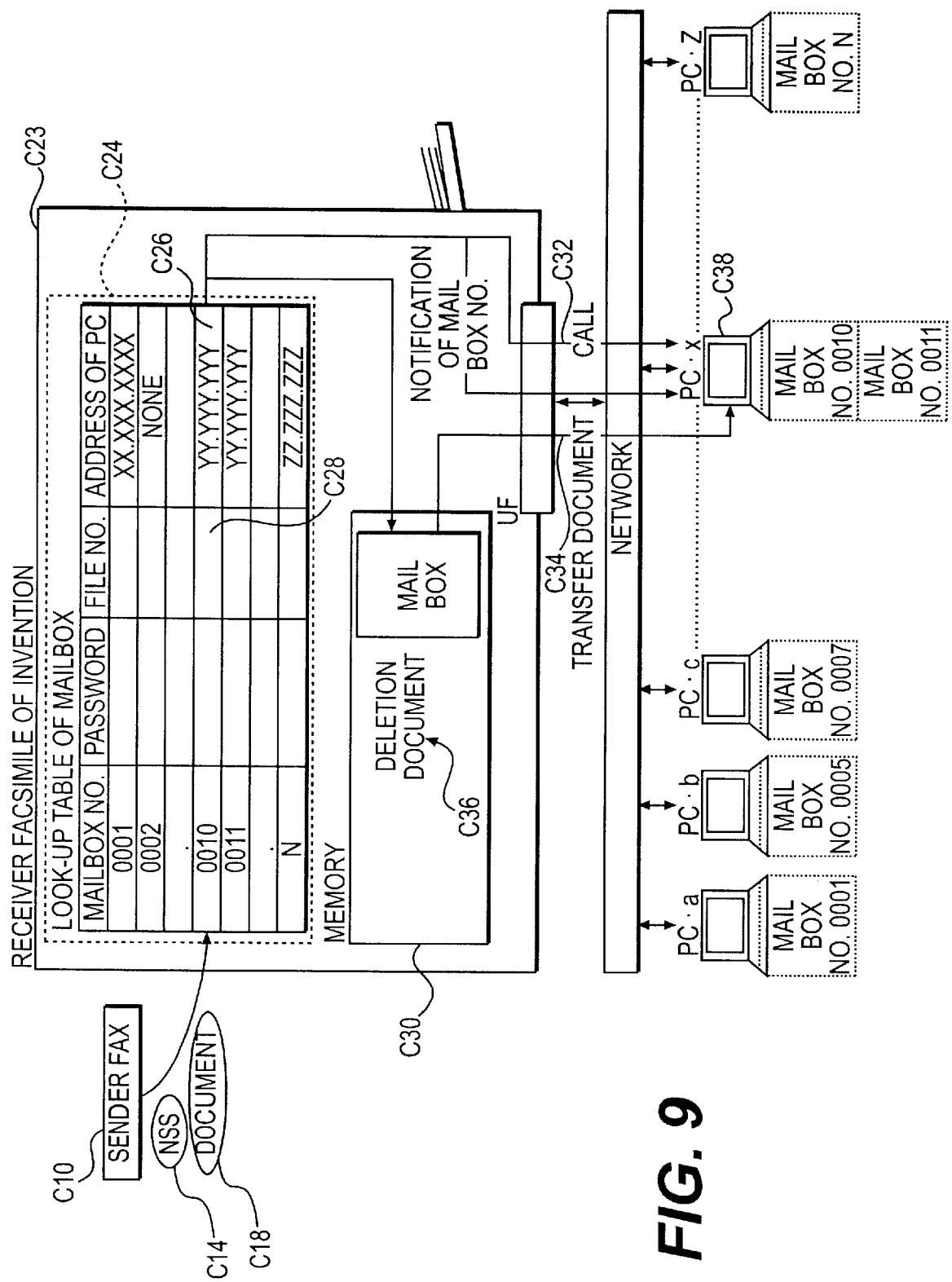
FIG. 9 is a diagram illustrating a document distribution system of the invention in which a network of PC mail boxes is provided.

In the present invention as shown in FIG. 9, a mail box reference table (enclosed by dotted line C24 in FIG. 9) in a receiver facsimile C23 stores the addresses of personal computers connected to the network associated with the mail boxes. With the personal computer addresses stored, the mail box numbers contained in the NSS command C14, are used to refer to the addresses of the personal computers in the reference table. When referring to the address items of the personal computers and nothing is contained in the item, a mail document directed to the sending station is detected. If the item contains the address of the personal computer, a mail document destined for the personal computer is detected and the receiver facsimile C23 can know the address of the destination personal computer.

On the basis of the identification information for designating the mail box contained in the NSS command C14, which comes from the transmitting facsimile C10, the receiver facsimile C23 determines whether a document is a general document or a mail document.

On the basis of the mail box number contained in the NSS command C14, the program compares the passwords while referring to the reference table C24 of the mail box. As a result of the comparison, if the passwords are coincident with each other, the program examines the item of the network address of the personal computer corresponding to the designated mail box number (as indicated by C26 in FIG. 9). Additionally, as a result of the comparison, if nothing is stored in the item of the network address of the personal computer, the document is determined to be a mail document destined for the sending facsimile apparatus (sending station). If the network address is stored therein, the document is determined to be a mail document to the personal computer.

If a mail box for the facsimile apparatus or a mail box for the personal computer is designated as a destination, the program specifies a memory location to which a received document is to be stored, while referring to the file number (C28 in FIG. 9), and then receives a document (C18 in FIG. 9) and adds to the received document information reference to the mail box number of the mail box stored in the reference table, and finally stores the received document with the added information into a specified memory location in memory C30.

In the case of a mail document destined for a personal computer, in transferring the mail document to the personal computer after it is stored, the receiver facsimile apparatus C23 calls a personal computer on a network on the basis of the address corresponding to the mail box number (as indicated by C32 in FIG. 9). When the called personal computer responds to the call, the facsimile apparatus C23 sends a mail box number to the personal computer (as indicated by C34 in FIG. 9), and transfers the mail document to the same. Upon completion of the transfer of the mail document, the receiver facsimile deletes the mail document transferred (as indicated by C36 in FIG. 9).

When a plural number of users use one personal computer C38 connected to the network, those users may have respective mail boxes. If these mail boxes are stored in the reference table C24 of the mail box, the receiver facsimile C23 sends the mail box number to the personal computer C38 thereby enabling the personal computer C38 to specify one of the users to which the mail document is destined.

As for passwords, if the NSS command C14 contains a password, a check is made. In some cases, the presence or absence of the password is determined depending on the style of usage of the communication system. In other cases, mail boxes having passwords and mail boxes not having passwords may coexist. In the former cases, in a communication system of low security, a particular password is not required. In the latter cases, where the mail box is used only by specific registered users, the password is required. In a mail box that can be used by any user to make an access to the mail box, a password is not required.

In this manner, in this embodiment, a network is constructed between one facsimile apparatus and a plurality of personal computers by matching therebetween, so that the main memories of the individual personal computers are used as mail boxes. Since the PC may be shared by a plurality of people, the main memory may have a plurality of mail boxes rather than a single box.

As mentioned above, according to the present invention, the memory in the computers may be used as mail boxes in addition to the mail boxes provided within the facsimile apparatus. Thus, the received document may be quickly distributed to the respective addresses, and loading on the main memory of the facsimile apparatus is alleviated.

What is claimed is:

1. A facsimile apparatus connected to at least one personal computer, comprising:

receiving means for receiving, through a public line, a communication procedure signal and a document from a transmitting station;

mail box information storage means for storing first mail box information corresponding to a mail box of said facsimile apparatus and second mail box information corresponding to a mail box of said personal computer;

storage means for storing a document destined for the mail box information storage means; and control means including
(a) first determining means for determining whether or not a document to be received is destined for the mail box of said facsimile apparatus or said personal computer based on the communication procedure signal received by said receiving means,
(b) second determining means for comparing designation information in the communication procedure signal with the first and second mail box information stored in said mail box information storage means to determine whether or not the document to be received is the document destined for a mail box of said personal computer,
(c) receive control means for controlling said receiving means to receive the document when said second determining means determines that the document to be received is the document destined for a mail box of said personal computer,
(d) storage control means for storing the document received by said receiving means into said storage means,
(e) transfer means for transferring the document stored in said storage means to said personal computer via a network, and
(f) erasing means for erasing the document, which is transferred by said transfer means, in said storage means.

2. The facsimile apparatus according to claim 1, in which the designating information includes at least a mail box number and the mail box information stored in said mail box information storage means includes at least a mail box number, wherein said second determining means of said control means compares the mail box number of the designating information contained in the predetermined communication procedure signal with the mail box number of the mail box information stored in said mail box information storage means, to thereby determine whether or not the received document is the document destined for the mail box of said personal computer.

3. The facsimile apparatus according to claim 2, in which said storage control means of said control means adds information for referring to the mail box number of the document to the document received by said receiving means under control of said receive control means, and stores the resultant document in said storage means, and said transfer means sends the mail box number of said document to said personal computer by way of said network, and transfers the document of said storage means to said personal computer by way of said network.

4. A facsimile apparatus connected to at least one personal computer, the facsimile apparatus and the personal computer each having at least one mail box, the facsimile apparatus comprising:

receiving means for receiving, through a public line, a communication procedure signal and a document from a transmitting station;

mail box information storage means for storing mail box information and indicating information indicative of whether the mail box information belongs to said facsimile apparatus or said personal computer;

storage means having a memory area for storing a general document destined for said facsimile apparatus and a mail document destined for the mail box of the facsimile apparatus or the personal computer; and control means including
(a) first determining means for determining whether or not a document to be received is a general document destined for said facsimile apparatus or a mail document destined for the mail box of the facsimile apparatus or the personal computer based on the communication procedure signal received by said receiving means,
(b) second determining means for determining whether or not the document to be received is a mail document destined for the mail box of said facsimile apparatus or a mail document destined for the mail box of said personal computer on the basis of the indicating information stored in said mail box information storage means
(c) receive control means for controlling said receiving means to receive the document destined for the mail box of said personal computer when said second determining means determines that the document to be received is the document destined for the mail box of said personal computer,
(d) storage control means for storing the document destined for the mail box of the personal computer into the memory area of,
(e) transfer means for transferring the document destined for the mail box of said personal computer from the memory area to said personal computer via a network, and
(f) erasing means for erasing the document in said storage means, previously transferred by said transfer means.

5. The facsimile apparatus according to claim 4, in which the predetermined communication procedure signal includes information indicative of a mail box function and at least a mail box number and the mail box information stored in said mail box information storage means includes at least a mail box number, and the indicating information includes a network address of said personal computer, and said second determining means determines on the basis of a presence or absence of a network address of said personal computer for the mail box number of the mail box information stored in said mail box storage means, which corresponds to the mail box number of the mail box designating information contained in the predetermined communication procedure.

6. The facsimile apparatus according to claim 5, in which said storage control means of said control means adds information for referring to the mail box number of the document to the document destined for the mail box of said personal computer, received by said receiving means under control of said receive control means, and stores the resultant document in said storage means, and said transfer means sends the mail box number of said document to said personal computer by way of said network, and transfers the document of said storage means to said personal computer by way of said network.

* * * * *